US009513148B2

(12) United States Patent
Hogendoorn

(10) Patent No.: US 9,513,148 B2
(45) Date of Patent: Dec. 6, 2016

(54) NUCLEAR MAGNETIC FLOW METER AND METHOD FOR OPERATION OF NUCLEAR MAGNETIC FLOW METERS WITH AN ADDITIONAL MEASURING DEVICE OPERATING ON A DIFFERENT PRINCIPLE

(71) Applicant: Krohne AG, Basel (CH)

(72) Inventor: Cornelius Johannes Hogendoorn, Spijk (NL)

(73) Assignee: Krohne AG, Basel (CH)

( * ) Notice: Subject to any disclaimer, the term of this patent is extended or adjusted under 35 U.S.C. 154(b) by 561 days.

(21) Appl. No.: 14/076,594

(22) Filed: Nov. 11, 2013

(65) Prior Publication Data
US 2014/0132260 A1 May 15, 2014

(30) Foreign Application Priority Data

Nov. 14, 2012 (DE) .......... 10 2012 022 243
Mar. 7, 2013 (DE) .......... 10 2013 003 837

(51) Int. Cl.
G01V 3/00 (2006.01)
G01F 1/74 (2006.01)
G01F 1/44 (2006.01)

(52) U.S. Cl.
CPC .. *G01F 1/74* (2013.01); *G01F 1/44* (2013.01)

(58) Field of Classification Search
CPC ............ G01F 1/74; G01F 1/44; G01R 33/307; G01N 24/08
USPC ......................... 324/306, 318, 321
See application file for complete search history.

(56) References Cited

U.S. PATENT DOCUMENTS

| 4,099,164 | A | * | 7/1978 | Sidor | ............. G01D 1/16 336/110 |
| 4,866,385 | A | | 9/1989 | Reichwein | |
| 5,398,554 | A | * | 3/1995 | Ogawa | ............. G01F 1/8409 73/861.355 |
| 5,549,008 | A | * | 8/1996 | Beauducel | ............. G01N 27/023 324/204 |

(Continued)

FOREIGN PATENT DOCUMENTS

| WO | 8404398 A2 | 11/1984 |
| WO | 9859220 A2 | 12/1998 |

OTHER PUBLICATIONS

Coulthard et al., "Non-Restrictive Measurement of Solids Mass Flowrate in Pneumatic Conveying Systems", Measurement and Control, vol. 24 (4), 1991, pp. 113-119.

(Continued)

*Primary Examiner* — Susan Lee
(74) *Attorney, Agent, or Firm* — David S. Safran

(57) ABSTRACT

A nuclear magnetic flow meter for measuring the flow rate of a multiphase medium which is flowing through a measuring tube with a nuclear magnetic measurement device, the nuclear magnetic measurement device being located around the measuring tube. The accuracy of the measurement of the flow rate for the gaseous phase is achieved in that, in addition to the nuclear magnetic measurement device, there is a further measurement device which implements another measurement principle, e.g. a differential pressure flow rate measurement device for measuring the differential pressure of the medium in the measuring tube. At least one pressure gauge at each of two measurement sites which are different in the longitudinal direction of the measuring tube.

14 Claims, 2 Drawing Sheets

(56) References Cited

U.S. PATENT DOCUMENTS

| | | | | |
|---|---|---|---|---|
| 5,770,805 A * | 6/1998 | Castel | G01F 1/20 | 73/861.04 |
| 5,793,216 A * | 8/1998 | Constant | G01F 1/663 | 324/639 |
| 5,905,206 A * | 5/1999 | Herwig | G01F 1/60 | 73/861.12 |
| 6,046,587 A * | 4/2000 | King | G01F 1/74 | 324/306 |
| 6,268,727 B1 * | 7/2001 | King | G01F 1/74 | 324/300 |
| 6,345,536 B1 * | 2/2002 | Morrison | G01F 1/50 | 73/861.04 |
| 6,463,810 B1 * | 10/2002 | Liu | G01F 1/44 | 73/861 |
| 6,550,345 B1 * | 4/2003 | Letton | G01F 1/662 | 73/861.27 |
| 6,561,041 B1 * | 5/2003 | Eck | G01F 1/74 | 73/861.04 |
| 6,898,986 B2 * | 5/2005 | Daniel | G01F 1/363 | 73/861.63 |
| 7,650,799 B2 * | 1/2010 | Atkinson | G01F 1/74 | 73/861.52 |
| 8,143,887 B2 * | 3/2012 | Pusiol | G01R 33/5617 | 324/300 |
| 2006/0071661 A1 * | 4/2006 | Ong | G01F 1/74 | 324/303 |
| 2011/0186157 A1 * | 8/2011 | Paul | G01N 30/32 | 137/565.01 |
| 2012/0092007 A1 * | 4/2012 | Li | G01F 1/74 | 324/306 |
| 2012/0132010 A1 * | 5/2012 | Cadalen | G01F 1/44 | 73/861.04 |

OTHER PUBLICATIONS

Lynch "Techniques de Debitmetrie Polyphasique Non Intrusive. Revue Bibliographique", Oil & Gas Science & Technology: Revue de L'Institut Francais Du Petrole, Editions Technip, vol. 46 (1), 1991, pp. 59-88.

* cited by examiner

NUCLEAR MAGNETIC FLOW METER AND METHOD FOR OPERATION OF NUCLEAR MAGNETIC FLOW METERS WITH AN ADDITIONAL MEASURING DEVICE OPERATING ON A DIFFERENT PRINCIPLE

BACKGROUND OF THE INVENTION

Field of the Invention

The invention relates to a nuclear magnetic flow meter for measuring the flow rate of a multiphase medium which is flowing through a measuring tube, with a nuclear magnetic measurement device, the nuclear magnetic measurement device being located around the measuring tube. Moreover, the invention also relates to a method for operation of nuclear magnetic flow meters.

Description of Related Art

The atomic nuclei of the elements which have a nuclear spin also have a magnetic moment which is caused by the nuclear spin. The nuclear spin can be construed as an angular momentum described by a vector, and accordingly the magnetic moment can also be described by a vector which is aligned parallel to the vector of the angular momentum. The vector of the magnetic moment of an atomic nucleus in the presence of a macroscopic magnetic field is aligned parallel to the vector of the macroscopic magnetic field at the location of the atomic nucleus. Here the vector of the magnetic moment of the atomic nucleus precesses around the vector of the macroscopic magnetic field at the location of the atomic nucleus. The frequency of the precession is called the Larmor frequency $\omega_L$ and is proportional to the amount of the magnetic field strength B. The Larmor frequency is computed according to the relationship $\omega_L = \gamma B$. Here, $\gamma$ is the gyromagnetic ratio which is maximum for hydrogen nuclei.

Measurement methods which influence the precession of atomic nuclei of a medium in the presence of a macroscopic magnetic field by excitation by means of a controlled magnetic field and which evaluate the action of the influence are called nuclear magnetic resonance measurement methods. Usually, the electrical signals which have been induced in a sensor coil by the precessing atomic nuclei after excitations are used as the output variable for the evaluation. The prerequisite for the measurement of a multiphase medium is that the individual phases of the medium can be excited to distinguishable nuclear magnetic resonances. The magnitude of the electrical signals which have been induced in the sensor coil by the precessing atomic nuclei of a phase of the medium is dependent on the number of precessing atomic nuclei per volumetric element in this phase, accordingly therefore dependent on the density of the phase, but also dependent on the duration of influence of the precessing atomic nuclei in the influencing controlled magnetic field. Consequently, the magnitude of the electrical signals for the liquid phases of the medium is larger than for the gaseous phases. It follows from this that, in nuclear magnetic flow meters, the measurement accuracy for the measurement of the liquid phase of the medium can be relatively accurate, while the smaller magnitude of the electrical signals for the gaseous phases adversely affects the measurement accuracy of the nuclear magnetic flow meters for the measurement of the gaseous phase, especially when the gaseous phase has a relatively low density and/or when the gaseous phase is flowing with a relatively high velocity through the measuring tube.

One example of measurement devices which use nuclear magnetic resonance is the initially addressed nuclear magnetic flow meters whose nuclear magnetic measurement devices can measure the flow rate, that is, the flow velocity of the individual phases of the medium and the relative proportions of the individual phases in the multiphase medium. Nuclear magnetic flow meters can be used, for example, for measuring the flow rate of a multiphase medium which has been conveyed from oil sources. This medium consists essentially of the liquid phases crude oil and salt water and the gaseous phase natural gas, all phases containing the hydrogen nuclei which are necessary for nuclear magnetic resonances and being excitable to different nuclear magnetic resonances.

In the measurement of the medium which has been conveyed from oil sources, it is also possible to work with test separators. The conveyed medium is introduced into test separators over a time interval and the test separators separate the individual phases of the medium from one another and determine the proportions of the individual phases in the medium. However, test separators, in contrast to nuclear magnetic flow meters, are not able to reliably separate proportions of crude oil smaller than 5%. Since the proportion of crude oil of all sources continuously decreases and the proportion of crude oil of a host of sources is already less than 5%, at present it is not possible to economically exploit these sources using test separators. In order to furthermore also be able to exploit sources with a very small proportion of crude oil, correspondingly accurate flow meters for the medium, crude oil, which consists of several phases are necessary. In particular, nuclear magnetic flow meters are possible for this purpose.

SUMMARY OF THE INVENTION

A primary object of this invention is, therefore, to devise a nuclear magnetic flow meter with improved accuracy of the measurement of the flow rate for the gaseous phase and to devise methods for the operation of nuclear magnetic flow meters.

The nuclear magnetic flow meter in accordance with the invention in which the aforementioned object is achieved is, first of all, characterized essentially in that, in addition, there is another measurement device which implements another measurement principle.

Different measurement principles for measuring the flow rate have different advantages and disadvantages. In a combination of two measurement devices which implement different measurement principles, the disadvantages of one measurement principle can be compensated by the advantages of the other measurement principle, at least in part.

There are measuring devices which work according to various measurement principles and with which the medium flowing altogether through a measuring tube can be measured relatively accurately. This applies, even if partially with limitations, to differential pressure flow rate measurement devices, to ultrasonic flow rate measurement devices, to a Coriolis flow rate measurement devices, and under certain circumstances also to magnetic-inductive flow rate measurement devices. Consequently, in the nuclear magnetic flow meter in accordance with the invention, the nuclear magnetic measuring device can be combined especially with a differential pressure flow rate measurement device, an ultrasonic flow rate measurement device, a Coriolis flow rate measurement device, and optionally, also with a magnetic-inductive flow rate measurement device.

At this point, with a nuclear magnetic flow meter in accordance with the invention, as compared to a nuclear magnetic flow meter which has only one nuclear magnetic measuring device, how can the measurement accuracy of the flow rate measurement for the gaseous phase be improved?

The nuclear magnetic flow meter in accordance with the invention comprises a nuclear magnetic measuring device and a additional measuring device which implements a measurement principle other than the nuclear magnetic measurement principle. If the additional measuring device is one with which the multiphase medium flowing altogether through the measuring tube can be measured relatively accurately, with the nuclear magnetic flow meter in accordance with the invention, first of all, two relatively accurate measured values are obtained, specifically with the additionally provided measuring device, a relatively accurate measured value for the multiphase medium flowing altogether through the measuring tube, and with the nuclear magnetic measuring device, a relatively accurately measured value for the liquid phase or the liquid phases of the multiphase medium flowing through the measuring tube. At this point, if the measured value which has been obtained with the nuclear magnetic measuring device for the liquid phase or the liquid phases of the medium flowing through the measuring tube is subtracted from the measured value which has been obtained with the additional measuring device for the medium flowing altogether through the measuring tube, a measured value for the gaseous phase of the multiphase medium flowing through the measuring tube is obtained with relative accuracy.

What was described above is an approach which ignores the fact that, for example, with a differential pressure flow rate measuring device which has a Venturi tube, the gaseous phase of a multiphase medium flowing through a measuring tube can be determined. In any case, the proportion of the liquid phase or the liquid phases must be considered, and the density of the multiphase medium flowing altogether through the measuring tube must also be considered. If a measured value has been determined with a differential pressure flow rate measuring device which has a Venturi tube, therefore the gaseous phase can then be estimated with a certain accuracy.

Therefore, under certain circumstances, different parameters must be considered, such as, for example, the density of the multiphase medium, for what was described above, therefore obtaining a relatively accurate first measured value for the multiphase medium flowing altogether through the measuring tube, obtaining a relatively accurate second measured value for the liquid phase or the liquid phases of the multiphase medium flowing through the measuring tube, and subtracting the second measured value from the first measured value.

Preferably, in the nuclear magnetic flow meter in accordance with the invention, the additional measuring device is a differential pressure flow rate measuring device which is made to measure the differential pressure of the medium in the measuring tube and which has at least one pressure gauge at each of at least two different measurement sites which are spaced from each other in the longitudinal direction of the measuring tube. The measurement sites, each of which has at least one pressure gauge, are provided at the sites of the measuring tube on which the pressure of the flowing medium in the measuring tube differs from one another due to the cross-sectional shape.

In particular, there are various possibilities of configuration and development for the above described nuclear magnetic flow meter in accordance with the invention in which therefore the additional measuring device is made as a differential pressure flow rate measuring device.

A first preferred embodiment of a nuclear magnetic flow meter in accordance with the invention with a differential pressure flow rate measuring device as an additional measuring device is wherein the measuring tube is formed of a first measuring tube component and a second measuring tube component and that the nuclear magnetic measuring device is located around the first measuring tube component and the additional measuring device is implemented in conjunction with the second measuring tube component.

Especially in the embodiment of a nuclear magnetic flow meter in accordance with the invention which was described last, but not only in it, the measuring tube in the longitudinal direction of the measuring tube has at least a first segment, a second segment which follows the first segment and a third segment which follows the second segment, the cross-sectional area in the first segment and in the third segment being constant and the cross-sectional area in the second segment having a characteristic form which differs from the cross-sectional areas in the first segment and in the third segment. This embodiment of a nuclear magnetic flow meter in which the measuring tube in the longitudinal direction of the measuring tube has at least a first segment, a second segment which follows the first segment and a third segment which follows the second segment, is especially feasible if the measuring tube is formed of a first measuring tube component and a second measuring tube component and there are segments of the measuring tube in the second measuring tube component. Preferably, the cross-sectional areas in the second segment are smaller than the cross-sectional areas in the first segment and in the third segments.

What was stated above with reference to the cross-sectional areas in the second segment can be implemented in different ways. In particular, the measuring tube in the second segment, when the measuring tube consists of a first measuring tube component and a second measuring tube component, can have an insert which can be attached in the second segment, preferably therefore in the second measuring tube component. This insert can have a conical cross-sectional shape preferably in the longitudinal direction of the measuring tube. It is also easily possible here to implement a diaphragm, a nozzle or a Venturi nozzle in the region of the second segment. The first segment, the second segment and the third segment can, together, form a Venturi tube. If the measuring tube is formed of a first measuring tube component and second measuring tube component, and the first segment, the second segment and the third segment of the measuring tube are provided in the second measuring tube component, then the second measuring tube component is made altogether as a Venturi tube.

An embodiment of a nuclear magnetic flow meter in accordance with the invention quite different from that described above is possible, specifically one in which the cross-sectional area in the second segment of the measuring tube is greater than the cross section areas in the first segment of the measuring tube and in the third segment of the measuring tube.

It has already been explained above, how with a nuclear magnetic flow meter in accordance with the invention compared to a nuclear magnetic flow meter which has only a nuclear magnetic measuring device, the measurement accuracy of the flow rate measurement for the gaseous phase can be improved, specifically by obtaining a relatively accurate first measured value for the multiphase medium flowing altogether through the measuring tube, obtaining a relatively accurate second measured value for the liquid phase or the liquid phases of the multiphase medium flowing through the measuring tube and subtracting the second measured value from the first measured value. This is a "black-white approach" which leaves ignored the fact that obtaining a relatively accurate first measured value for the multiphase medium which is flowing altogether through the measuring tube when a differential pressure flow rate measuring device is used as the additional measuring device, is dependent on the density of the medium flowing through the measuring tube and that the density, in turn, is dependent on the composition of the multiphase medium flowing through the measuring tube, specifically on the proportions of the liquid phase or the liquid phases and the gaseous phase. How this dependency of the density of the multiphase medium flowing through the measuring tube can be considered is explained below.

So far, the nuclear magnetic flow meter in accordance with the invention and preferred embodiments of the nuclear magnetic flow meter in accordance with the invention have been described in which a differential pressure flow rate measuring device is implemented as an additional measuring device. However, the invention is not limited to what follows from the statements made above.

The teaching of the invention also includes a nuclear magnetic flow meter in which the other measuring device is an ultrasonic flow rate measuring device. This nuclear magnetic flow meter in accordance with the invention can then be used especially well when the multiphase medium flowing through the measuring tube, and thus, also its gaseous phase are flowing with a relatively high velocity through the measuring tube, especially also when the multiphase medium which is flowing through the measuring tube is a "wet gas" in which the liquid phase is so to speak in droplet form in the gaseous phase, or when the inside of the measuring tube is wetted by the liquid phase or the liquid phases.

In particular, there are now various possibilities for configuring and developing the nuclear magnetic flow meter and method for operating nuclear magnetic flow meters in accordance with the invention. In this respect reference is made to the description of preferred exemplary embodiments in conjunction with the accompanying drawings.

DETAILED DESCRIPTION OF THE INVENTION

Figure 1:
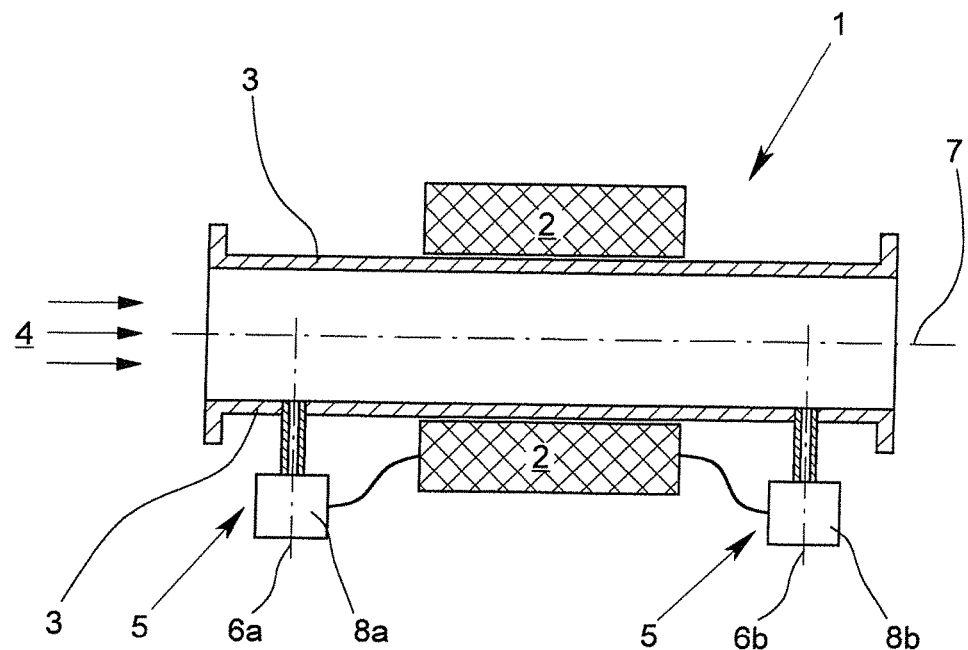
FIG. 1 schematically shows a first exemplary embodiment of the nuclear magnetic flow meter in accordance with the invention with a one-piece measuring tube, FIG. 2 schematically shows a second exemplary embodiment of the nuclear magnetic flow meter in accordance with the invention with a measuring tube which is formed of first and second measuring tube components.
Figure 2:
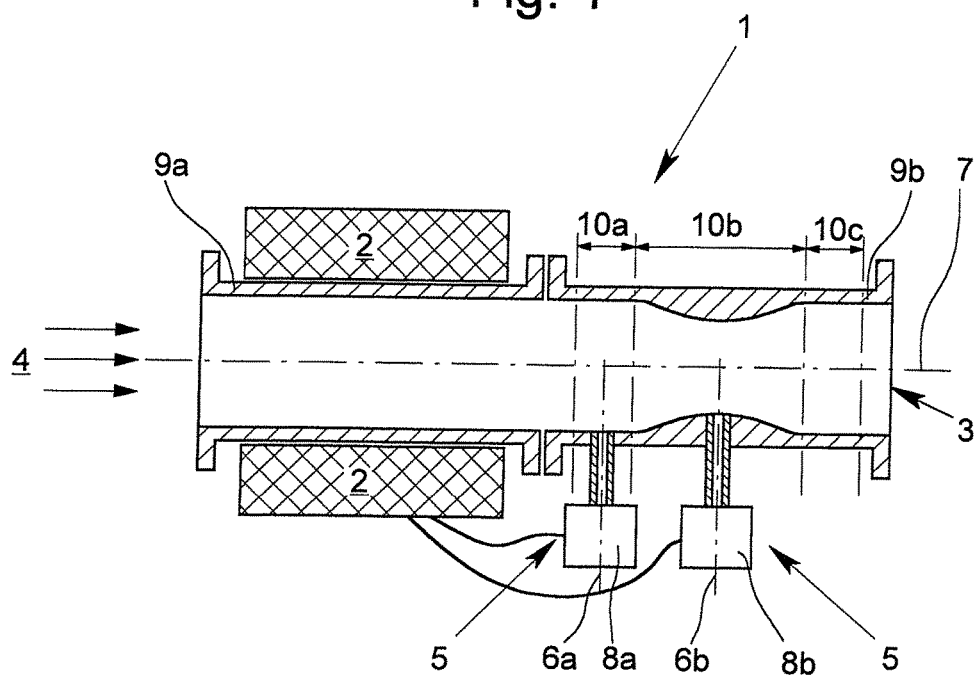

FIG. 1 schematically shows a first exemplary embodiment and FIG. 2 shows a second exemplary embodiment of the nuclear magnetic flow meter 1 in accordance with the invention. Each of the nuclear magnetic flow meters 1 comprises a nuclear magnetic measurement device 2 for measuring the flow rate of a multiphase medium 4 which is flowing through a measuring tube 3. The nuclear magnetic measurement device 2 is located around the measuring tube 3. In addition, there is an additional measurement device which works according to a measurement principle other than the nuclear magnetic measurement principle. In both exemplary embodiments, the other measurement device is a differential pressure flow rate measurement device 5. Here, the differential pressure flow rate measurement device 5 has a pressure gauge 8a, 8b at each of two longitudinal sites 6a, 6b which are spaced from each other in the longitudinal direction 7 of the measuring tube 3.

Both in the first exemplary embodiment and also in the second exemplary embodiment of the nuclear magnetic flow meter 1 in accordance with the invention, the pressure of the medium 4 in the measuring tube 3 is measured through openings in the wall of the measuring tube 3. Here, there is one or more pressure gauges 8a, 8b at each of the two measurement sites 6a, 6b. The resulting redundancy increases the accuracy of the pressure measurements. Commercial pressure sensors are used as pressure sensors in the pressure gauges 8a, 8b.

The measuring tube 3 in the first exemplary embodiment of the nuclear magnetic flow meter 1 in accordance with the invention, see FIG. 1, has a constant inner cross-sectional area shape in the longitudinal direction 7 of the measuring tube 3. Due to the friction between the medium 4 and the measuring tube 3 which is caused by the flow of the medium 4, the pressure of the medium 4 in the measuring tube 3 drops in the flow direction of the medium 4 in the longitudinal direction 7 of the measuring tube. Accordingly, the pressure gauges 8a, 8b measure pressures of different magnitude; the pressure at the measurement site 6a is higher than the pressure at the measurement site 6b.

The measuring tube 3 in the second exemplary embodiment of the nuclear magnetic flow meter in accordance with the invention, see FIG. 2, is formed of a first measuring tube component 9a and of a second measuring tube component 9b. The nuclear magnetic measurement device 2 is located around the first measuring tube component 9a. The further measurement device, in the exemplary embodiment therefore the differential pressure flow rate measurement device 5, is implemented in conjunction with the second measuring tube component 9b. The first measuring tube component 9a is therefore part of the partially magnetic measurement device 2, while the second measuring tube component 9b is part of the differential pressure flow rate measurement device 5. The nuclear magnetic measurement device 2 with the first measuring tube component 9a and the differential pressure flow rate measurement device 5 with the second measuring tube component 9b form the, so to speak, modular nuclear magnetic flow meter 1 in accordance with the invention.

As FIG. 2 shows, in the second exemplary embodiment, the second measuring tube component 9b of the measuring tube 3 has a first segment 10a, a second segment 10b which follows the first segment 10a and a third segment 10c which follows the second segment 10b. The cross-sectional areas in the first segment 10a and in the third segment 10c are constant, while the cross-sectional area in the second segment 10b has a shape which differs from the cross-sectional areas in the first segment 10a and in the third segment 10c. Specifically, the cross-sectional areas in the second segment 10b are smaller than the cross-sectional areas in the first segment 10a and in the third segment 10c. Specifically the segments 10a, 10b, and 10c of the second measuring tube component 9b form a Venturi tube. By making the second measuring tube component 9b as a Venturi tube, the pressure difference between the pressure gauges 8a, 8b is greater than the pressure difference between the pressure gauges 8a, 8b in the first exemplary embodiment. This higher pressure difference can lead to improved measurement accuracy.

In the exemplary embodiment shown in FIG. 2, the first measuring tube component 9a of the measuring tube 3 is located in the longitudinal direction 7 of the measuring tube 3, therefore in the flow direction of the medium 4, upstream of the second measuring tube component 9b. However, it is also possible to provide the first measuring tube component 9a downstream of the second measuring tube component 9b. Depending on the arrangement of the first measuring tube component 9a with reference to the second measuring tube component 9b, the first measuring tube component 9a can constitute either the inlet region of the nuclear magnetic flow meter 1 in accordance with the invention or its outlet region.

The nuclear magnetic measurement device 2 and the first measuring tube component 9a, together, form the initially described nuclear magnetic flow meter. The second measuring tube component 9b and the differential pressure flow rate measurement device 5 expand the nuclear magnetic measurement device modularly into the nuclear magnetic flow meter 1 in accordance with the invention.

The inner cross-sectional area shape of the second measuring tube component 9b of the measuring tube 3 is divided along the longitudinal axis 7 into three segments, specifically into a first segment 10a, a second segment 10b which follows the first segment 10a in the flow direction of the medium 4, and a further third segment 10c which follows the second segment 10b in the flow direction. The cross-sectional areas along the longitudinal axis 7, both in the first segment 10a and also in the third segment 10c, are constant while the cross-sectional area shape along the longitudinal axis 7 in the second segment 10b has a cross-sectional area which differs from the cross-sectional areas in the first segment 10a and in the second segment 10b. Quite specifically, the cross-sectional area shape of the segments 10a, 10b and 10c, together, forms a Venturi tube. There are longitudinal sites 6a, 6b on which the two pressure gauges 8a, 8b are located at sites along the longitudinal axis 7 at which the pressures of the flowing medium 4 in the measuring tube component 9b differ from one another based on the cross-sectional shape; the pressure of the medium 4 which has been measured by the pressure gauge 8a is higher than the pressure which has been measured by the pressure gauge 8b.

By making the second measuring tube component 9b as a Venturi tube, the pressure difference between the pressure gauges 8a, 8b is greater than the pressure difference between the pressure gauges 8a, 8b in the first exemplary embodiment. A higher flow resistance of the medium 4 in the measuring tube 3 also goes along with the higher pressure difference. A higher pressure difference results in better measurement precision.

Viewed in the flow direction of the medium 4, the first measuring tube component 9a is located upstream of the second measuring tube component 9b. But it is also possible to arrange the first measuring tube component 9a downstream of the second measuring tube component 9b. For precision pressure measurement, both an inlet region upstream and also an outlet region downstream of the second measuring tube component 9b are necessary. Depending on the arrangement of the first measuring tube component 9a with reference to the second measuring tube component 9b, the first measuring tube component 9a can constitute either the inlet region or the outlet region.

The nuclear magnetic flow meter 1 in accordance with the invention can be operated as follows for measuring the flow rate of a multiphase medium 4 flowing through a measuring tube 3:

A measured value for the multiphase medium 4 flowing altogether through the measuring tube 3 is determined with the further measurement device provided in the nuclear magnetic flow meter 1 in accordance with the invention, in the illustrated and described exemplary embodiment, therefore, the differential pressure flow rate measurement device 5.

With the nuclear magnetic measurement device 2, a measured value for the liquid phase or the liquid phases of the medium 4 flowing through the measuring tube 3 is determined, To determine the measured value for the gaseous phase of the medium 4 flowing through the measuring tube 3, the measured value for the liquid phase or the liquid phases of the multiphase medium 4 flowing through the measuring tube 3 which was obtained with the nuclear magnetic measurement device 2 is subtracted from the measured value obtained with the additional measuring device, in the exemplary embodiment therefore the differential pressure flow rate measurement device 5, for the multiphase medium 4 flowing altogether through the measuring tube 3.

Preferably, in the above described method, the determination of the measured value for the multiphase medium 4 flowing altogether through the measuring tube 3 is repeated, preferably repeated several times, and an average value is formed from the measured values which have been obtained in doing so and the measured value for the liquid phase or the liquid phases of the multiphase medium flowing through the measuring tube 3 is subtracted from the measured value formed to determine the measured value for the gaseous phase of the multiphase medium 4 flowing through the measuring tube 3.

It has already been stated above that the above addressed method for operating a nuclear magnetic flow meter 1 is based on a "black-white approach" which leaves ignored the fact that obtaining a relatively accurate first measured value for the multiphase medium as a whole which is flowing through the measuring tube 3, in any case, when a differential pressure flow rate measuring device 5 is being used as the additional measuring device, is dependent on the density of the medium 4 flowing through the measuring tube 3 and that the density of the medium 4 flowing through the measuring tube 3, in turn, is dependent on the composition of the multiphase medium 4 flowing through the measuring tube 3, specifically on the proportions of the liquid phase or of the liquid phases and the gaseous phase in the multiphase medium 4 flowing through the measuring tube 3. Taking this into account, a method for operating a nuclear magnetic flow meter 1 for measuring the flow rate of a multiphase medium 4 which is flowing through a measuring tube 3 is recommended, the nuclear magnetic flow meter 1 having a nuclear magnetic measurement device 2 and an additional measurement device which implements another measurement principle, preferably a differential pressure flow rate measurement device 5, is wherein, with the additional measurement device, a measured value is determined repeatedly, specifically successively for the multiphase medium 4 as a whole flowing through the measuring tube 3, and that, for the $(n+1)^{th}$ determination, the measured value which has been obtained in the $n^{th}$ determination is taken into account. In doing so, therefore, in the (n+1) determination of the measured value for the multiphase medium 4 flowing through the measuring tube 3, the measured value obtained in the $n^{th}$ determination is taken into account, therefore the dependency of the density of the multiphase medium 4 flowing through the measuring tube 3 on the composition of the multiphase medium 4 flowing through the measuring tube 3 is taken into account.

What was explained above, therefore the repeated determination of the multiphase medium flowing through the measuring tube 3 is preferably carried out using the additional measurement device until the difference between the measured value which was obtained in the $(n+1)^{th}$ determination and the measured value which was obtained in the $n^{th}$ determination is smaller than a given difference which is regarded as allowable, for example, a difference of 3% or less, under certain circumstances even of 1%.

In the above described repeated determination of the multiphase medium 4 flowing altogether through the measuring tube 3 using the further measurement device, in the second determination, in the third determination, up to the $(n+1)^{th}$ determination an algorithm or algorithms are used which determine the density of the multiphase medium 4 flowing through the measuring tube 3 based on the composition of the multiphase medium 4 flowing altogether through the measuring tube 3, therefore on the proportion of the liquid phase or the liquid phases on the one hand and of the gaseous phase on the other.

Figure 3:
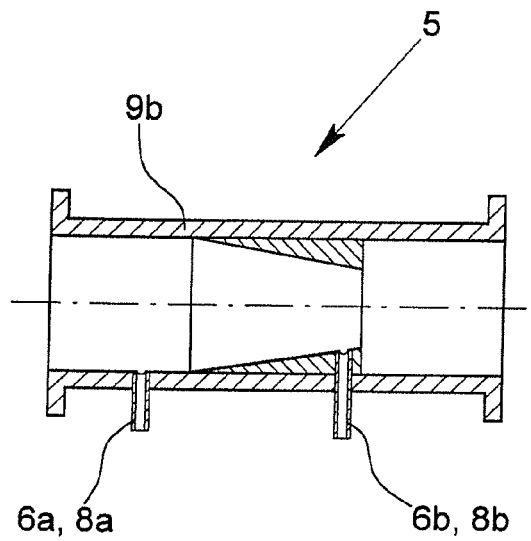
FIG. 3 shows an exemplary embodiment in which an insert is used to reduce the cross-sectional area of a portion of the measuring tube.
Figures 4A, 4B, 4C:
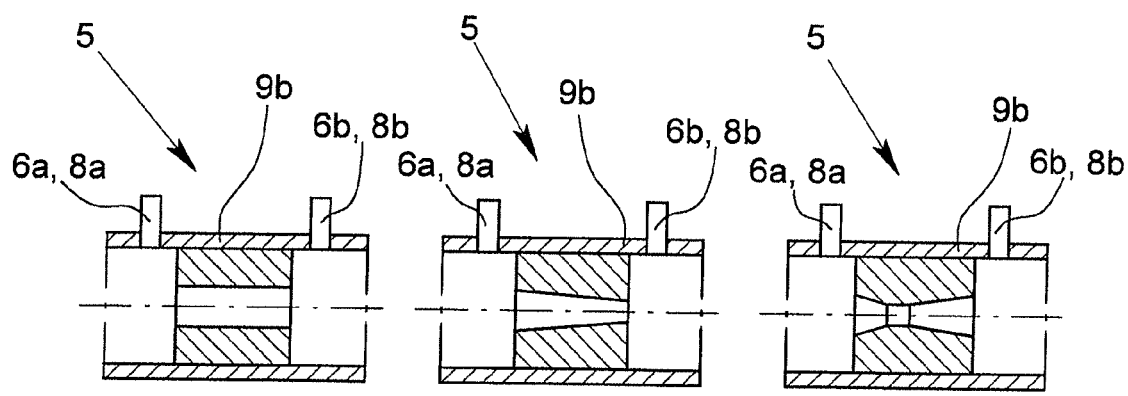
FIGS. 4a-4c show exemplary embodiments in which, respectively, a diaphragm, a nozzle and a Venturi is provided to reduce the cross-sectional area of a portion of the measuring tube.

What was stated above with reference to the cross-sectional areas in the second segment 9b can be implemented in different ways. In particular, the measuring tube, in the second segment 9b, when the measuring tube is formed of a first measuring tube component 9a and a second measuring tube component 9b, can have an insert which can be attached in the second segment, preferably therefore in the second measuring tube component. This insert can have a conical cross-sectional shape as shown in FIG. 3, preferably in the longitudinal direction of the measuring tube. It is also easily possible here to implement a diaphragm as shown in FIG. 4a, a nozzle as shown in FIG. 4b or a Venturi nozzle as shown in FIG. 4c in the region of the second segment.

What is claimed is:

1. A nuclear magnetic flow meter for measuring flow rate of a multiphase medium comprising:
    a measuring tube through which a multiphase medium is able to flow,
    a nuclear magnetic measurement device surrounding the measuring tube, and
    an additional measurement device which operates on a measurement principle other than that of the nuclear magnetic measurement device,
    wherein the additional measurement device is a differential pressure flow rate measurement device, wherein the differential pressure flow rate measurement device is adapted for measuring a pressure differential of the medium in the measuring tube, and where the differential pressure flow rate measurement device comprises at least one pressure gauge at each of at least two measurement sites which are spaced from each other in a longitudinal direction of the measuring tube.

2. The nuclear magnetic flow meter in accordance with claim 1, wherein the measurement sites are provided at locations at which the pressure of the flowing medium in the measuring tube differs from one another due to differences in cross-sectional shape of the measuring tube.

3. The nuclear magnetic flow meter in accordance with claim 1, wherein the measuring tube is formed of a first measuring tube component and a second measuring tube component and wherein the nuclear magnetic measurement device is located around the first measuring tube component and the additional measurement device is implemented in conjunction with the second measuring tube component.

4. The nuclear magnetic flow meter in accordance with claim 1, wherein the measuring tube has at least one first segment, a second segment which follows the first segment and a third segment which follows the second segment in the longitudinal direction of the measuring tube, and wherein the first and third segments have a constant cross-sectional area and wherein the second segment has a cross-sectional area which differs from the cross-sectional areas of the first and third segments.

5. The nuclear magnetic flow meter in accordance with claim 3, wherein the measuring tube has at least one first segment, a second segment which follows the first segment and a third segment which follows the second segment in the longitudinal direction of the measuring tube, and wherein the first and third segments have a constant cross-sectional area and wherein the second segment has a cross-sectional area which differs from the cross-sectional areas of the first and third segments, and wherein the segments of the measuring tube are formed in the second measuring tube component.

6. The nuclear magnetic flow meter in accordance with claim 5, wherein the cross-sectional area of the second segment is smaller than the cross-sectional area of the first and third segments.

7. The nuclear magnetic flow meter in accordance with claim 4, wherein the cross-sectional area of the second segment is smaller than the cross-sectional area of the first and third segments.

8. The nuclear magnetic flow meter in accordance with claim 6, wherein the cross-sectional area of the second segment has been made smaller by an insert which is fastened in the second segment of the measuring tube.

9. The nuclear magnetic flow meter in accordance with claim 8, wherein the insert has a conical cross-sectional shape in the longitudinal direction of the measuring tube.

10. The nuclear magnetic flow meter in accordance with claim 6, wherein one of a diaphragm, a nozzle and a Venturi is provided in the region of the second segment.

11. The nuclear magnetic flow meter in accordance with claim 6, wherein the segments together form a Venturi tube.

12. A method for operating a nuclear magnetic flow meter for measuring flow rate of a multiphase medium, having a gaseous phase and at least one liquid phase, which flows through a measuring tube, the nuclear magnetic flow meter having a nuclear magnetic measurement device and an addition measurement device which operates on a measurement principle other than nuclear magnetic measurement, comprising the steps of:
    determining a measured value for the multiphase medium flowing altogether through the measuring tube with the additional measurement device,
    determining a measured value for the at least one liquid phase of the multiphase medium flowing through the measuring tube with the nuclear magnetic measurement device, and
    determining a measured value for the gaseous phase of the multiphase medium flowing through the measuring tube using the measured value obtained by the nuclear magnetic measurement device for the at least one liquid phase of the multiphase medium flowing through the measuring tube being subtracted from the measured value obtained with the additional measurement device for the multiphase medium flowing altogether through the measuring tube, wherein the determination of the measured value for the multiphase medium flowing through the measuring tube is repeated, and an average value formed from the measured values obtained thereby and wherein the measured value for the at least one liquid phase of the multiphase medium flowing through the measuring tube is subtracted from the average value to determine the measured value for the gaseous phase of the multiphase medium flowing through the measuring tube.

13. The method in accordance with claim 12, wherein the measured value for the multiphase medium flowing altogether through the measuring tube is determined repeatedly with the additional measurement device, and for the $(n+1)^{th}$ determination, the measured value which has been obtained in the $n^{th}$ determination is taken into account.

14. The method in accordance with claim 13, wherein the repeated determination of the multiphase medium flowing through the measuring tube is carried out using the additional measurement device until the difference between the measured value obtained in the $(n+1)^{th}$ determination and the measured value obtained in the $n^{th}$ determination is smaller than a predetermined allowable difference.

* * * * *